(12) United States Patent
Uthaicharoenpong et al.

(10) Patent No.: US 11,524,695 B2
(45) Date of Patent: Dec. 13, 2022

(54) INTERFACE FOR HARMONIZING PERFORMANCE OF DIFFERENT AUTONOMOUS VEHICLES IN A FLEET

(71) Applicant: Motional AD LLC, Boston, MA (US)

(72) Inventors: Tawit Uthaicharoenpong, Singapore (SG); Lixun Lin, Singapore (SG); Yee Keng Cheah, Singapore (SG); Ryan William Eggert, Cambridge, MA (US); Alejandro Israel Barragan Diaz, Singapore (SG)

(73) Assignee: Motional AD LLC, Boston, MA (US)

( * ) Notice: Subject to any disclaimer, the term of this patent is extended or adjusted under 35 U.S.C. 154(b) by 200 days.

(21) Appl. No.: 16/751,164

(22) Filed: Jan. 23, 2020

(65) Prior Publication Data

US 2020/0231168 A1 Jul. 23, 2020

Related U.S. Application Data

(60) Provisional application No. 62/796,070, filed on Jan. 23, 2019.

(51) Int. Cl.
*B60W 50/04* (2006.01)
*B60W 50/08* (2020.01)
(Continued)

(52) U.S. Cl.
CPC ....... *B60W 50/045* (2013.01); *B60R 16/0231* (2013.01); *B60W 10/18* (2013.01);
(Continued)

(58) Field of Classification Search
CPC .... B60W 50/045; B60W 50/08; B60W 10/20; B60W 10/18; B60W 2050/0075; H04W 4/40; B60R 16/0231; G07C 5/008
See application file for complete search history.

(56) References Cited

U.S. PATENT DOCUMENTS 9,855,894 B1 * 1/2018 Khorasani .......... G06K 9/00805
2003/0221668 A1 * 12/2003 Hashimoto ........... F02D 11/107
123/399

(Continued)

FOREIGN PATENT DOCUMENTS

JP 2004320940 A * 11/2004 .............. H02G 3/16

*Primary Examiner* — Calvin Cheung
(74) *Attorney, Agent, or Firm* — Fish & Richardson P.C.

(57) ABSTRACT

Among other things, we describe techniques for an interface board for harmonizing performance of different autonomous vehicles in a fleet. In an embodiment, the interface system includes a printed circuit board installed in a host vehicle that includes an interface controller and interface circuitry coupled to the interface controller. The interface circuitry includes a plurality of relays configured by the interface controller to route/pass sensor signals received from actuators of the host vehicle to the interface controller, and route/pass control signals from the interface controller to actuator controllers of the host vehicle that control the actuators in accordance with an operating mode. Signal conditioning circuitry in the interface controller conditions the sensor signals and control signals to ensure that the electrical characteristics of the sensor signals are compatible with the interface controller, and that the electrical characteristics of the control signals are compatible with the actuator controllers.

21 Claims, 9 Drawing Sheets

(51) Int. Cl.
*B60W 10/20* (2006.01)
*B60W 10/18* (2012.01)
*H04W 4/40* (2018.01)
*B60R 16/023* (2006.01)
*G07C 5/00* (2006.01)
*B60W 50/00* (2006.01)

(52) U.S. Cl.
CPC ............ *B60W 10/20* (2013.01); *B60W 50/08* (2013.01); *G07C 5/008* (2013.01); *H04W 4/40* (2018.02); *B60W 2050/0075* (2013.01); *B60W 2050/041* (2013.01); *B60W 2556/65* (2020.02)

(56) References Cited

U.S. PATENT DOCUMENTS

| | | | |
|---|---|---|---|
| 2006/0015231 A1* | 1/2006 | Yoshimura | B60T 7/12 701/48 |
| 2010/0262404 A1* | 10/2010 | Bertness | G01R 31/3842 702/183 |
| 2010/0271199 A1* | 10/2010 | Belov | G01M 5/0008 340/539.3 |
| 2015/0081156 A1* | 3/2015 | Trepagnier | G05D 1/0248 701/26 |
| 2015/0206206 A1* | 7/2015 | Puente | G06Q 30/0283 705/307 |
| 2015/0363797 A1* | 12/2015 | Ramesh | H04L 12/18 705/7.29 |
| 2016/0147225 A1* | 5/2016 | Sights | G05D 1/027 701/23 |
| 2016/0209841 A1* | 7/2016 | Yamaoka | B60W 30/00 |
| 2016/0334790 A1* | 11/2016 | Rust | B60T 7/22 |
| 2017/0249787 A1* | 8/2017 | Remboski | G07C 5/12 |
| 2018/0265019 A1* | 9/2018 | Dry | B60R 16/0232 |

\* cited by examiner

INTERFACE FOR HARMONIZING PERFORMANCE OF DIFFERENT AUTONOMOUS VEHICLES IN A FLEET

CROSS-REFERENCE TO RELATED APPLICATION

This application claims priority to U.S. Provisional Patent Application No. 62/796,070, filed Jan. 23, 2019, the entire contents of which are incorporated herein by reference.

FIELD OF THE INVENTION

This description relates to electronic interface boards, and more particularly to electronic interface boards for retrofitting host vehicles for autonomous operation.

BACKGROUND

An autonomous vehicle is often a manually driven host vehicle (HV) that has been retrofitted with an autonomous driving platform. The retrofitting usually includes connecting an electronic interface board between the autonomous driving platform and electronic control units (ECUs) of the HV, such as electronic control units (ECUs) for controlling the steering, throttling, and braking of the HV. For fleets of autonomous vehicles, it may be desirable to retrofit HVs of different make, model, and build. Because the electrical characteristics of control signals for operating HVs often differ from HV to HV, a different interface board and/or different version of autonomous driving software is developed for each different HV, which can be expensive and time consuming for large fleets of autonomous vehicles.

SUMMARY

Techniques are provided for an electronic interface system for retrofitting an HV for autonomous operation. In an embodiment, an interface system comprises a host vehicle including actuator sensors, actuator controllers and an interface board coupled to the actuator sensors and actuator controllers. The interface board includes: relays operable to route sensor signals and control signals to and from the electronic interface board; signal conditioning circuitry operable to adjust electrical characteristics of the sensor and control signals; an interface controller coupled to the relays and the signal conditioning circuitry. The interface controller is operable to: obtain configuration data for the host vehicle from a plurality of configuration data for different host vehicles; enable the signal conditioning circuitry to condition the sensor signals received from the actuator sensors using the configuration data; enable the relays to route the conditioned sensor signals to inputs of the interface controller; output the control signals to the relays; enable the relays to pass the control signals to the signal conditioning circuitry; and enable the signal conditioning circuitry to condition the control signals using the configuration data.

In an embodiment, the interface controller is operable to cause a graphical user interface to be presented on a display. The graphical user interface allows a user to: select the host vehicle from a plurality of different host vehicles; receive a user selection of the host vehicle; and obtain the configuration data for the host vehicle in accordance with the user selection.

In an embodiment, the graphical user interface provides a testing environment that can be used to test the interface board performance and capabilities before the board is put into the host vehicle. The graphical user interface can also be used to test and control a number of interface boards at the same time. In an embodiment, the graphical user interface includes controls that allow the user to manually select calibration data from the configuration data to compensate for offsets in the sensor signals or control signals.

In an embodiment, the configuration data includes data rates and the graphical user interface includes controls that allow the user to manually select data rates for the sensor signals and control signals.

In an embodiment, the configuration data is stored on the interface board.

In an embodiment, the interface board is operable to: automatically detect that the interface board is coupled to the host vehicle; receive data from the host vehicle that identifies a make, model or build of the host vehicle; and obtain the configuration data for the identified make, model or build of the host vehicle.

In an embodiment, the interface board obtains the configuration data from an AV computer system.

In an embodiment, one of the actuator sensors is a steering torque sensor and one of the actuator controllers is a steering electronic control unit (ECU) that controls steering torque of the host vehicle.

In an embodiment, one of the actuator sensors is a throttle pedal sensor and one of the actuator controllers is a throttle electronic control unit (ECU) that controls the throttle of the host vehicle.

In an embodiment, one of the actuator sensors is a brake pedal displacement sensor and one of the actuator controllers is brake electronic control unit (ECU) that controls the brakes of the host vehicle.

In an embodiment, the signal conditioning circuit is operable to adjust at least one of voltage, current or data rate of the sensor signals or control signals.

In an embodiment, the interface controller is further operable to: monitor one or more of the sensor signals or control signals for offset errors; and automatically compensate the sensor signals or control signals using the configuration data.

In an embodiment, the interface system further comprises a wireless transceiver that allows wireless communication with a network-based computing platform through a wireless access point, and to obtain the configuration data from the network-based computing platform through the wireless access point.

In an embodiment, the configuration data is used to configure a driving mode of the host vehicle for a particular weather or road condition.

In an embodiment, the configuration data is applied to a throttle of the HV to ensure the HV does not exceed a maximum or minimum speed.

In an embodiment, an interface board comprises: a printed circuit board; relays disposed on the printed circuit board and operable to route sensor signals and control signals to and from the electronic interface board; signal conditioning circuitry disposed on the printed circuit board and operable to adjust electrical characteristics of the sensor and control signals; an interface controller disposed on the printed circuit board and coupled to the relays and the signal conditioning circuitry. The interface controller operable to: obtain configuration data for a host vehicle from a plurality of configuration data for different host vehicles; enable the signal conditioning circuitry to condition sensor signals received from actuator sensors of the host vehicle using the configuration data so that the sensor signals are compatible with the interface controller; enable the relays to route the conditioned sensor signals to inputs of the interface controller; output control signals to the relays; enable the relays to pass the control signals to the signal conditioning circuitry; and enable the signal conditioning circuitry to condition the control signals using the configuration data so that the control signals are compatible with actuator controllers of the host vehicle.

In an embodiment, the interface board further comprises a storage device operable to store the configuration data.

In an embodiment, the interface board further comprises: analog-to-digital converters operable to convert analog sensor signals into digital sensor signals; and digital-to-analog converters operable to convert digital control signals into analog control signals.

In an embodiment, the signal conditioning circuitry includes voltage or current level shifting circuitry.

In an embodiment, the interface controller or signal conditioning circuitry is operable to adjust at least one of the data rates of the sensor signals or the data rate of the control signals.

In an embodiment, a method comprises: obtaining, using an interface controller, configuration data for a host vehicle from a plurality of configuration data for different host vehicles; enabling, using the interface controller, signal conditioning circuitry to condition sensor signals received from actuator sensors of a host vehicle using the configuration data; enabling, using the interface controller, relays to route the conditioned sensor signals to inputs of the interface controller; outputting, using the interface controller, control signals to the relays; enabling, using the interface controller, the relays to pass the control signals to the signal conditioning circuitry; and enabling, using the interface controller, the signal conditioning circuitry to condition the control signals using the configuration data.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
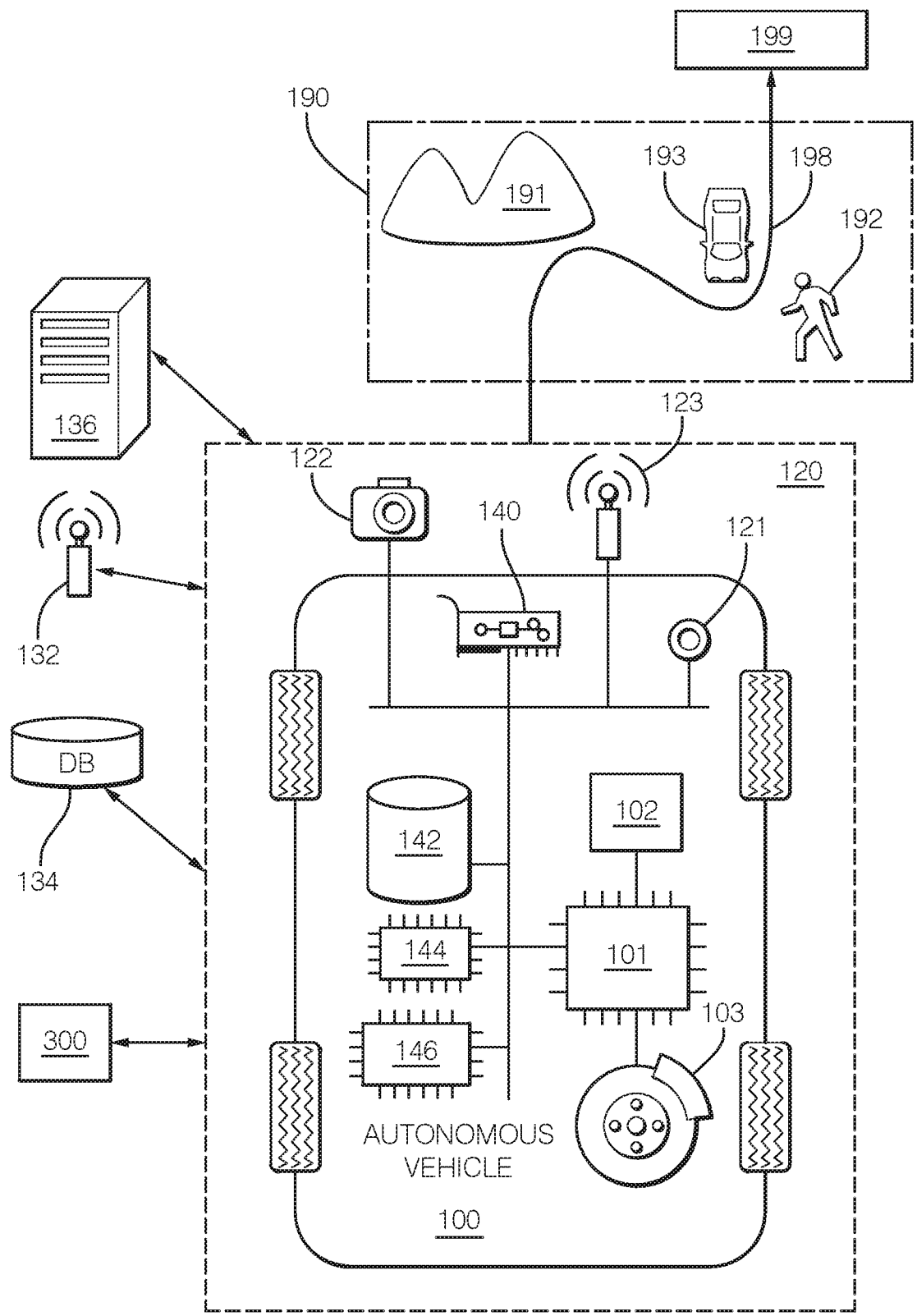
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements, or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships, or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Control
4. Interface System General Overview Techniques are provided for an electronic interface system for retrofitting an HV for autonomous operation. In an embodiment, the interface system includes a printed circuit board (PCB) with an interface controller (e.g., a microcontroller or "MCU") and interface circuitry coupled to the interface controller. In an embodiment, the interface circuitry includes a plurality of relays configured by the interface controller to route/pass sensor signals received from actuators of the HV to the interface controller, and route/pass control signals from the interface controller to actuator controllers of the HV that control the HV actuators in accordance with an operating mode of the HV (e.g., autonomous, or manual driving modes). Signal conditioning circuitry in the interface controller conditions the sensor signals and control signals to ensure that the electrical characteristics of the sensor signals are compatible with the interface controller, and that the electrical characteristics of the control signals are compatible with the actuator controllers. In an embodiment, the interface controller circuit or conditioning circuitry includes at least one analog-to-digital converter (ADC) and digital-to-analog converter (DAC) to convert analog sensor signals output by the actuator controllers to digital sensor signals that can be received by the interface controller (e.g., an MCU), and convert digital control signals output by the interface controller to analog controls signals that can be received by the actuator controllers.

In an embodiment, the interface controller and/or a signal conditioning circuitry in the interface board is programmable or otherwise configurable to receive and/or apply configuration data to the sensor and/or control signals that are tailored to a specific HV (e.g., to a specific make, model, year and build). Some examples of configuration data include but are not limited to: calibration data, data rates, signal levels (e.g., voltage or current levels), frame formats, bandwidth, filter coefficients, damping data or any other electrical characteristic or data characteristic. In an embodiment, the configuration data is received wirelessly from a network-based computing platform and stored in cache memory of the interface controller or other location in the interface system (e.g., flash memory on the interface board). In an embodiment, the configuration data is tailored to improve the performance of a specific make, model and build of the HV for certain weather and/or road surface conditions (e.g., wet, snowy or icy conditions) to improve performance and/or comfort for the passengers, and/or to compensate for errors (e.g., offset errors) introduced into the sensor or control signals by electrical, mechanical or electromechanical components in the HV due to, damage, wear or for any other reason. For example, the configuration data can be used to configure a driving mode of the HV for a particular weather or road surface condition. For example, the configuration data can be used to provide quicker torque application and more sensitive feedback by adjusting the suspension and steering settings of the HV, respectively. In an embodiment, configuration data can be used to adjust steering gears to provide increased on-center sharpness and steering sensitivity for more precise control of the HV. In an embodiment, configuration data is used to adjust damping for each wheel of the HV to maintain an optimal vehicle ride control over a particular road surface condition to reduce and control vehicle roll, pitch and vertical motions for a flat ride performance. In an embodiment, the configuration data is used to adjust damping to a firm level for improved handling and stability of the HV, and to a soft level to provide increased isolation from the road surface and thus improved ride comfort for the passengers of the HV.

In an embodiment, a testing environment for the interface board can be implemented using a personal computer. The personal computer can couple to a communication port of the interface board to communicate with the interface controller on the interface board. The testing environment presents a graphical user interface that allows a technician to test the performance and capability of the interface board before it is installed in the host vehicle. The GUI allows different interface boards to be tested.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are a global navigation satellite system (GNSS) such as global positioning system (GPS), inertial measurement unit (IMU) that measures both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV A100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
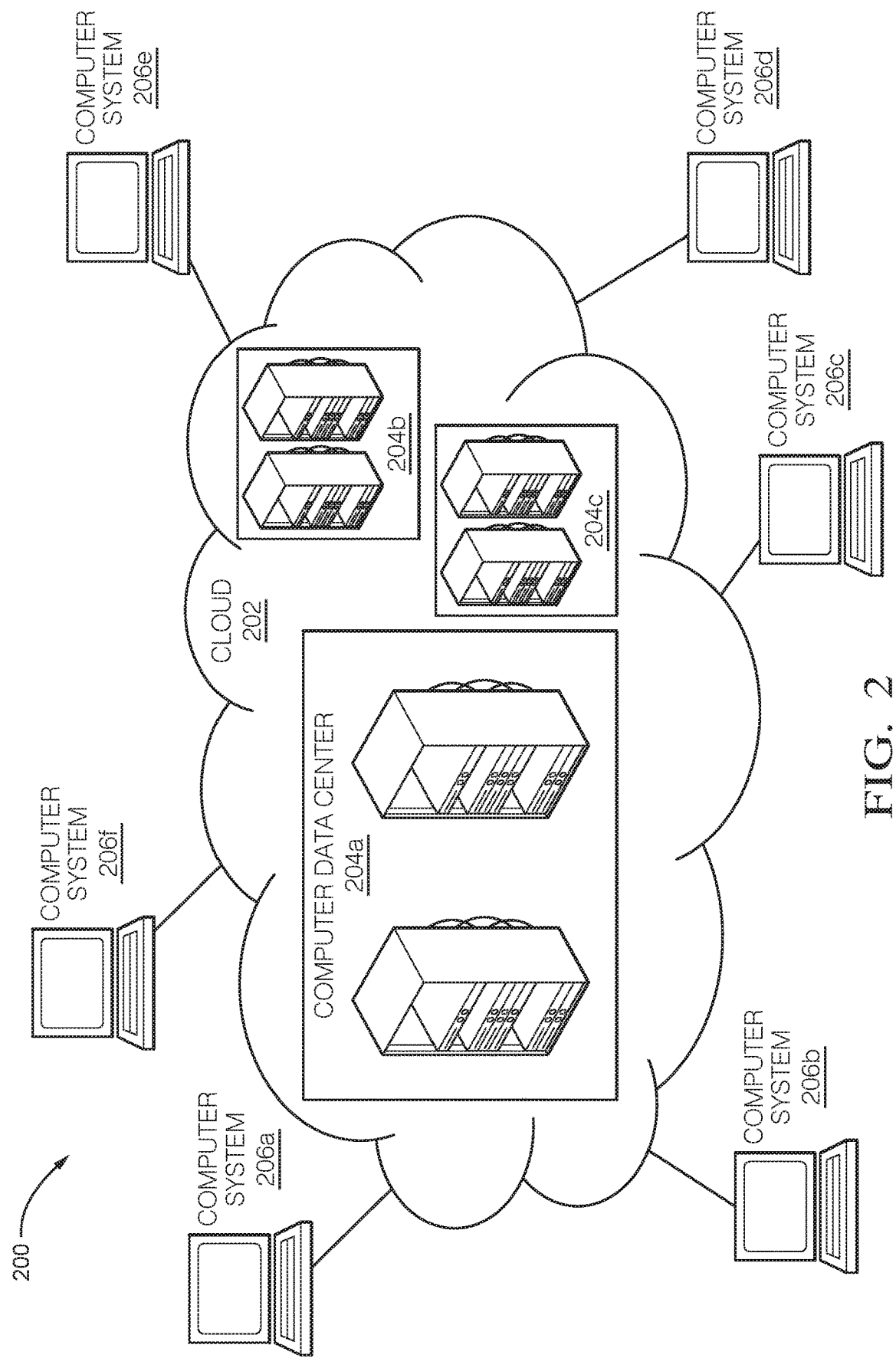
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202 (e.g., a network). Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
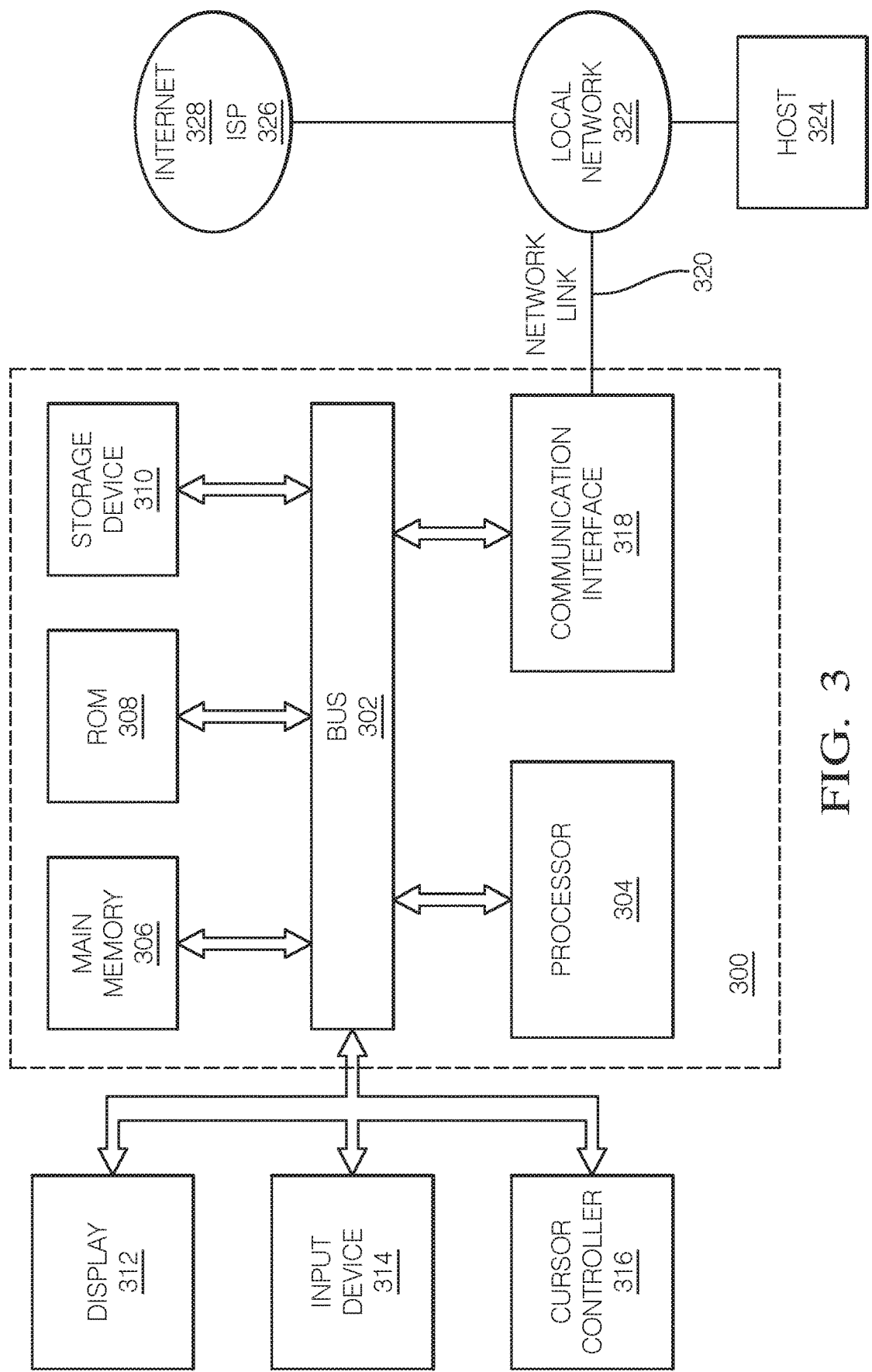
FIG. 3 illustrates a computer system.

FIG. 3 illustrates a computer system 300 for the AV 100. The computer devices described elsewhere in this application may be similar to the computer systems 300. In an embodiment, the computer system 300 is similar to computing devices 146 described above. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled to the bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

In an embodiment, the bus 302 is coupled to an electronic interface board 420 that is used to retrofit a manually driven host vehicle into AV 100, as described in reference to FIGS. 5-7 below.

Autonomous Vehicle Control

Figure 4:
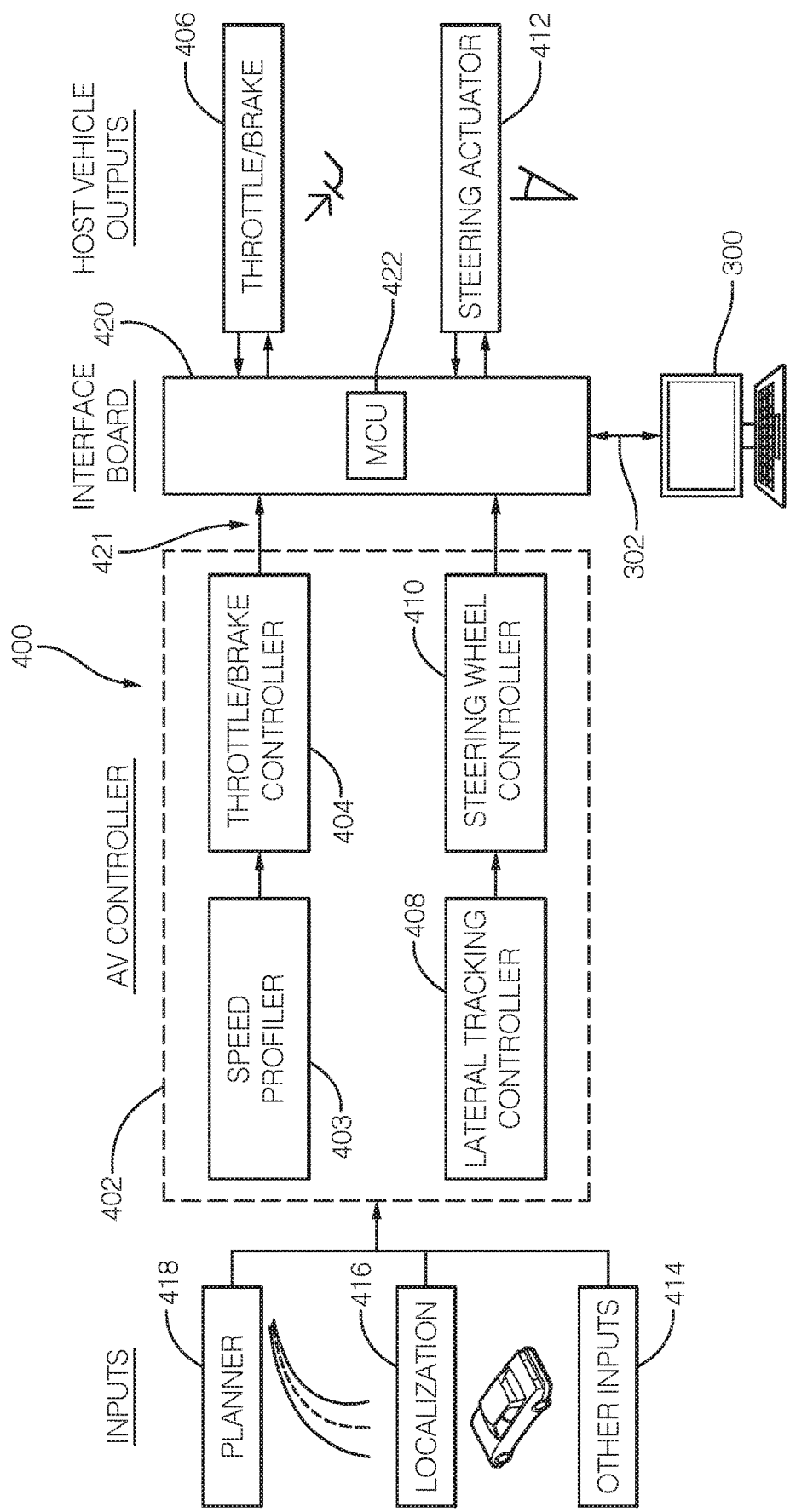
FIG. 4 shows a block diagram of the inputs, outputs, and components of a controller.

FIG. 4 shows a block diagram 400 of the inputs, outputs, and components of a controller 402 for the AV 100. The controller 402 has a speed profiler 402 which affects the operation of a throttle/brake controller 404. For example, the speed profiler 402 instructs the throttle/brake controller 404 to engage acceleration or engage deceleration using the throttle/brake 406 depending on, e.g., feedback received by the controller 402 and processed by the speed profiler 402.

The controller 402 also has a lateral tracking controller 408 which affects the operation of a steering controller 410. For example, the lateral tracking controller 408 instructs the steering controller 410 to adjust the position of the steering angle actuator 412 depending on, e.g., feedback received by the controller 402 and processed by the lateral tracking controller 408.

The controller 402 receives several inputs used to determine how to control the throttle/brake 406 and steering angle actuator 412. A planning module 418 provides information used by the controller 402, for example, to choose a heading when the AV 100 begins operation and to determine which road segment to traverse when the AV 100 reaches an intersection. A localization module 416 provides information to the controller 402 describing the current location of the AV 100, for example, so that the controller 402 can determine if the AV 100 is at a location expected based on the manner in which the throttle/brake actuators 406 and steering angle actuator 412 are being controlled. In an embodiment, the controller 402 receives information from other inputs 414, e.g., information received from databases, computer networks, etc., including computer system 300 for the AV 100.

In an embodiment, the controller 402 is coupled to an electronic interface board 420 using a communication bus 421. The interface board 420 includes an interface controller 422 configured to receive sensor signals from throttle/brake actuators 406 and steering actuator 412, and to provide control signals from throttle/brake controller 404 and steering wheel controller 410 to actuator controllers. In an embodiment, the interface board 420 can also be coupled to computer system 300 through bus 302 to receive configuration data, as described in reference to FIG. 5.

Interface System

Figure 5:
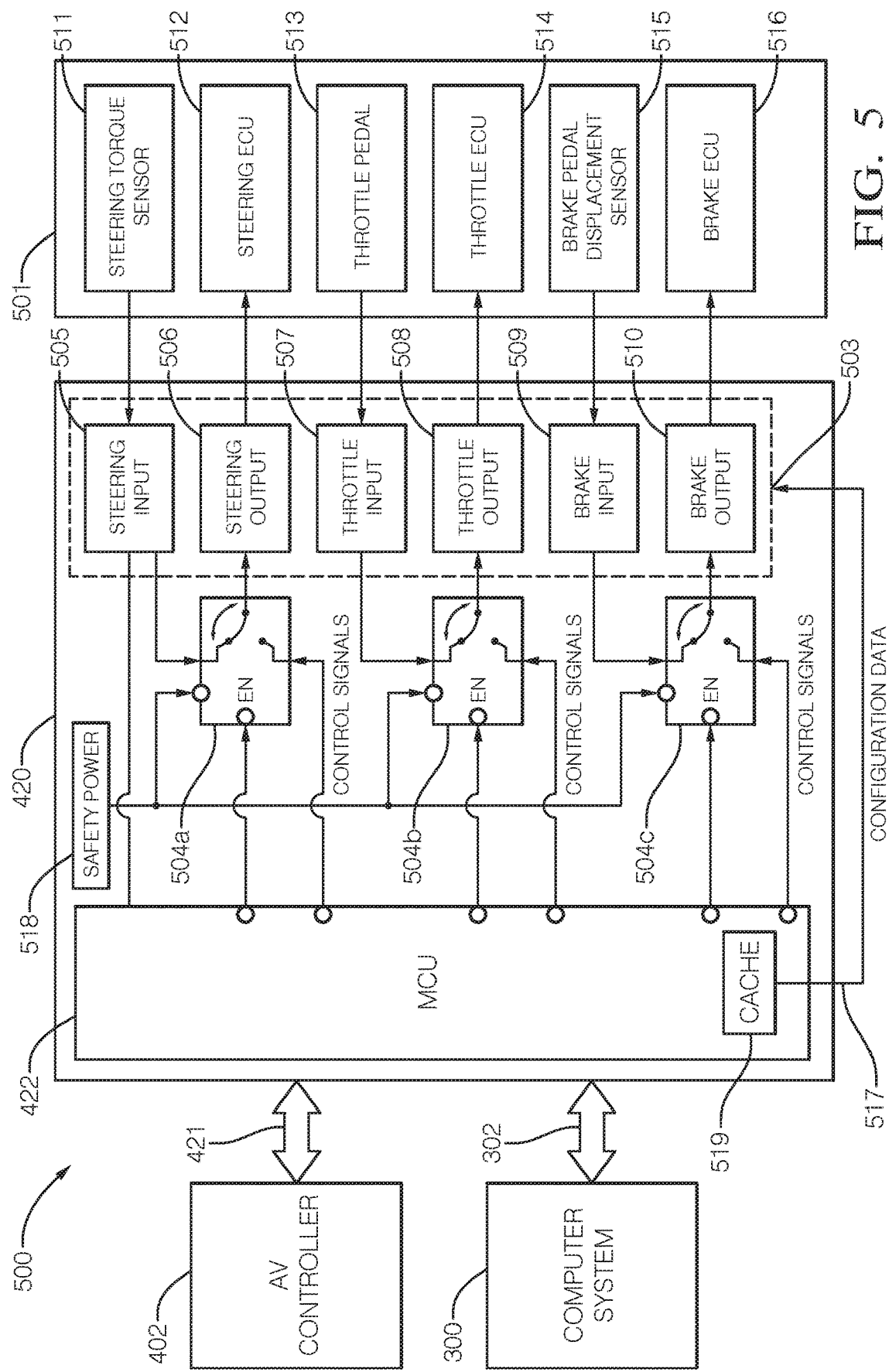
FIG. 5 is schematic diagram of an electronic interface board for harmonizing performance of different autonomous vehicles in a fleet.

FIG. 5 is schematic diagram of an interface system 500 for harmonizing performance of different AVs in a fleet. System 500 includes the interface board 420, which includes interface controller 422, relays 504a-504c and signal conditioning circuitry 503. In an embodiment, the interface controller 422 is a STM32F407VGT6 microcontroller (MCU) manufactured by STMicroelectronics of Shanghai, China.

Interface board 420 is installed on a manually driven HV to retrofit the HV into AV 100 for autonomous operation. In an embodiment, the interface board 420 can be coupled to controller 402 through communication interface 421 and communication system 300 through bus 302, as shown in FIG. 4. Interface board 420 is further coupled to native HV components 501, which include actuator sensors 511, 513, 515 and their corresponding actuator controllers 512, 514 and 516. In the example shown, actuator sensor 511 is a steering torque sensor and actuator controller 512 is a steering electronic control unit (ECU) for controlling the steering of the AV 100. Actuator sensor 513 is a throttle pedal sensor and actuator controller 514 is an ECU for controlling the throttle of the AV 100. Actuator sensor 515 is a brake pedal displacement sensor and actuator controller 516 is an ECU for controlling the braking system of AV 100.

Although the example interface board 420 shows three actuator sensors and three actuator controllers, the interface board 420 can include any number of actuator sensors and actuator controllers (e.g., transmission sensors and corresponding ECUs, emissions sensors and corresponding ECUs, power window/door sensors and ECUs, etc.).

Signal conditioning circuitry 503 includes single conditioning circuits 505-510 for adjusting the electrical characteristics (e.g., voltage, current, frequency spectrum, bandwidth, clocking, state) of the sensor signals and control signals. The signal conditioning circuits 505-510 can include but are not limited to: amplifiers, voltage/current dividers, filters, multiplexers, comparators, buffers, latches, voltage, or current level adjustors, etc. The signal conditioning circuitry 503 ensures that the electrical characteristics of the signals output by actuator sensors 511, 513, 515 are compatible with the interface controller 422, and that the control signals output by the interface controller 422 are compatible with the ECUs 512, 514, 516. If the interface controller 422 does not include an ADC or DAC, one or more ADCs and/or DACs can be included in the signal conditioning circuitry 503 to perform the needed signal conversion.

In an embodiment, one or more of the signal conditioning circuits 505-510 can receive configuration data from the interface controller 422 over bus 517. Configuration data includes but is not limited to one or more of: calibration data, filter coefficients, initial conditions, scalars, weights, data rates and any other data used by the signal conditioning circuits 505-510 to condition the sensors and control signals. In an embodiment, memory 519 on the interface board (not shown) stores the configuration data.

Relays 504a-504c receive as inputs the outputs (conditioned sensor signals) of the signal conditioning circuits 505-510 and control signals from output control ports of the interface controller 422. Each relay of the relays 504a-504c has an enable/disable input coupled to a separate enable/disable port of the interface controller 422. In response to disable signals indicating a manual driving mode, the relays 504a-504c are operable/configured to route/pass the conditioned sensor signals output by the signal conditioning circuit 503 back through the signal conditioning circuitry 503 and to the ECUs 512, 514, 516, thus bypassing the control signals from the interface controller. In response to enable signals from the enable ports indicating autonomous driving mode, the relays 504a-504c are operable/configured to route/pass the control signals from the output control ports of the interface controller 421 to the ECUs 512, 514, 516 in place of the sensor signals provided by the actuator sensors 511, 513, 515.

In an embodiment, the relays 504a-504c are coupled to a backup power supply 518 (e.g., a battery) to ensure that the relays 504a-504c still function in the event of power failure of the main power supply, thus allowing the AV 100 to be safely operated.

Manual Configuration and Testing of Interface Board

Figure 6A:
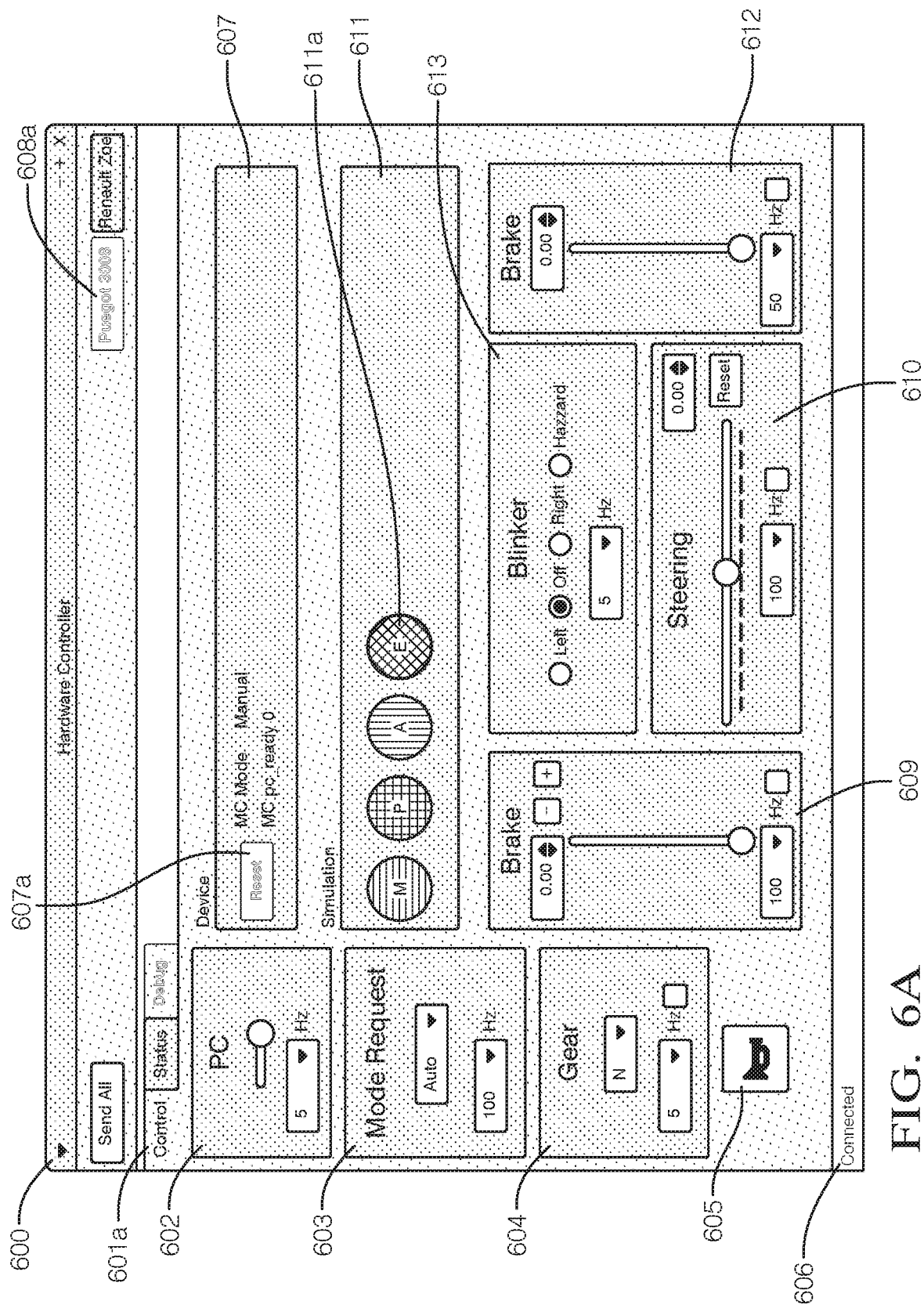
FIGS. 6A-6C show a graphical user interface (GUI) for testing the electronic interface board of FIG. 5.
Figure 6B:
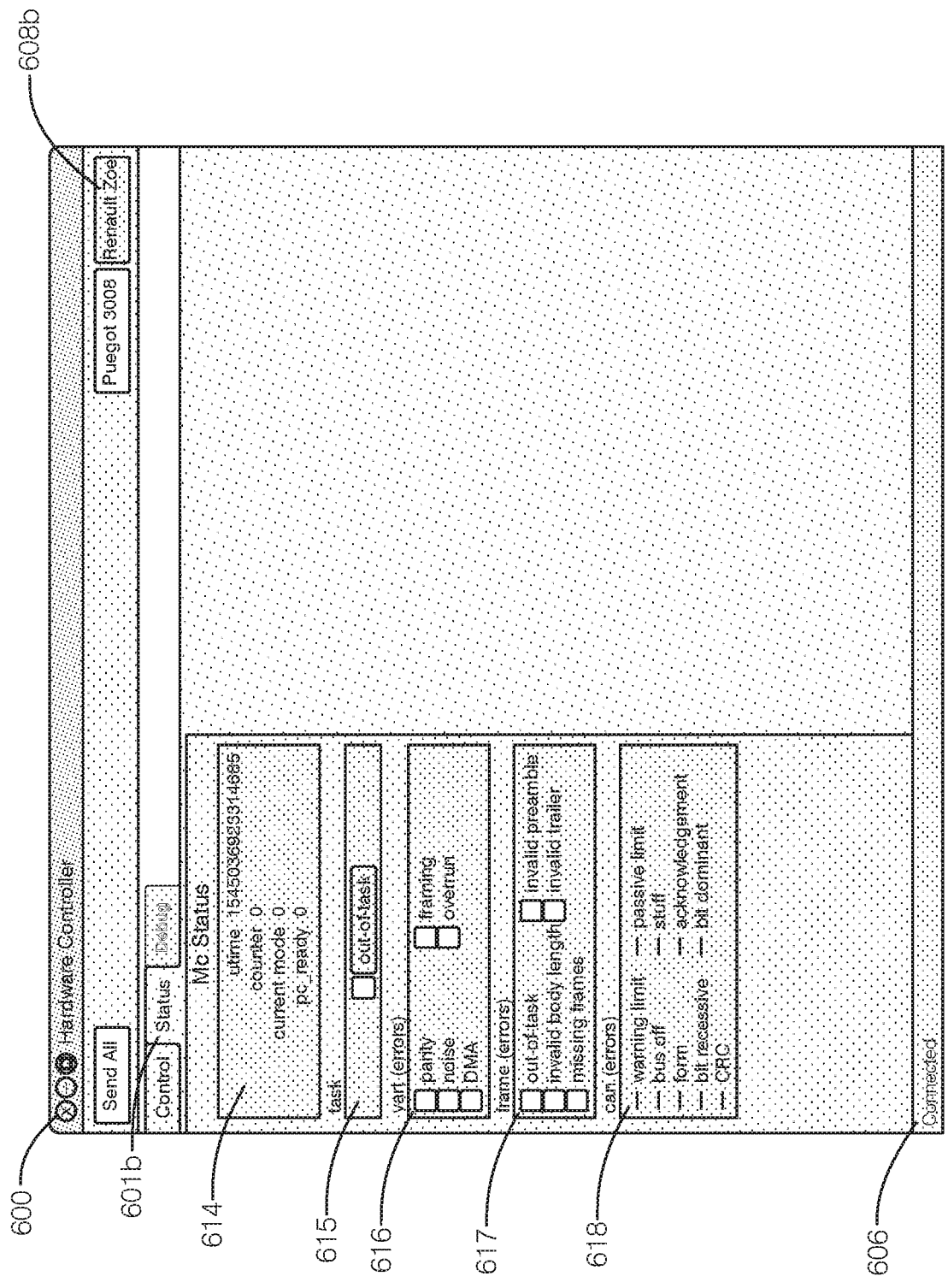
Figure 6C:
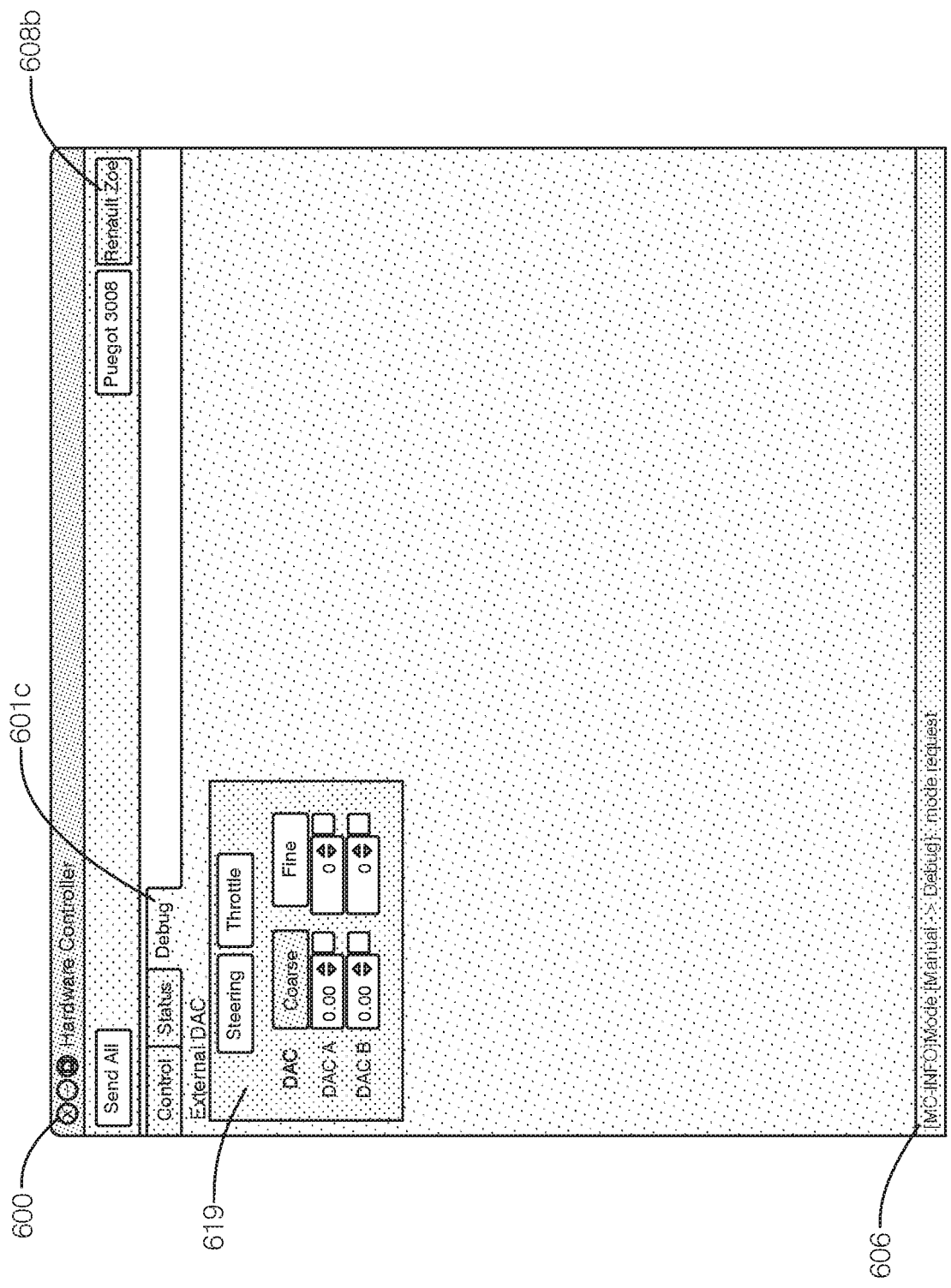

FIGS. 6A-6C show a GUI 600 for a testing environment to test the interface board 420 of FIG. 5. GUI 600 can be presented, for example, on display 310 of computer system 300 (FIG. 3), or can be displayed on a separate test computer remote to the AV 100 (e.g., a computer in an auto repair shop). In an embodiment, the interface board 420 is tested and/or configured after installation in the HV. During the testing and configuration, the GUI 600 is used to transmit signals from various controllers and HV components to the interface board 420. In another embodiment, the interface board 420 is tested/and or configured prior to installation in the HV. During the testing, the testing environment via the GUI 600 generates and transmits signals that emulate signals from various controllers and HV components to the interface board 420. In an embodiment, the testing environment includes special purpose test bed hardware and/or test bed software. In an embodiment, the testing environment is utilized to test and configure multiple interface boards. In an embodiment, the testing environment generates various alerts or messages via GUI 600 according to whether the interface board 420 passes testing.

In the example shown, GUI affordances 680a, 608b (e.g., virtual buttons) are shown for "Peugeot 3008" and "Renault Zoe" vehicles, respectively, with affordance 608b for the Renault Zoe currently selected. Although the example GUI affordances shown are virtual buttons, any GUI affordance can be used in GUI 600, including but not limited to: menus, sliders, dials, check boxes and the like. GUI 600 can be specifically tailored to the HV selected. For example, the GUI 600 for a Renault Zoe can have more or fewer display modules then the GUI for the Peugeot 3008. In an embodiment, GUI 600 includes a tab control that allows the user to select between control and status tabs, with a control tab 601a currently selected.

Referring to FIG. 6A, the layout of the control tab 601a includes a number of display modules 602-613. In an embodiment, default configuration data (e.g., default calibration data) for the selected HV are loaded into the display modules 602-613 from the storage device 519 or other storage device. The control tab 601 shown is tailored to the Renault Zoe. Other HVs (e.g., the Peugeot 3008) can have more or fewer display modules. In an embodiment, the control tab is used to test multiple boards that may be installed in multiple HVs of same make and model or of different make and models.

The display module 602 of GUI 600 allows the user to adjust the frequency of the signals being received from the onboard AV computer system 300, which is currently selected to be 5 Hz (0.2 seconds). The display module 602 is used to test whether the AV computer system 300 can successfully communicate with the interface board 420. Depending upon the frequency selected, the testing environment transmits signals from the AV computer system to the interface board 420. If the ratio of the frequency of messages sent from the AV computer system to the frequency of messages received by the interface board 420 is within a predetermined threshold, the GUI 600 may generate an alert or a message to indicate that the interface board 420 is successfully communicating with the AV computer system. In an embodiment, the GUI 600 generates an alert or a message if the interface board 420 cannot communicate with the AV computer system. In an embodiment, the testing environment emulates the interface board's 420 connection to the AV computer system by sending signals at the selected frequency to the interface board 420. The GUI 600 generates an alert indicating that the interface board 420 is functioning within acceptable tolerance level based on the ratio of the simulated signals sent by the testing environment to the simulated signals received by the interface board 420.

The display module 603 allows the user to select an operation mode for testing, such as autonomous or manual, with the autonomous mode currently selected. The user can also select a data rate for communications between the computer system 300 and the interface controller 422 via the interface board 420.

The display module 604 allows the user to test whether the interface board 420 is successfully transmitting gear control data from the AV controller 402 to the gear control system of the HV. Display module 604 allows a user to select a gear to test, such as neutral, drive, reverse, low, $1^{st}$, $2^{nd}$, $3^{rd}$, etc., and the frequency at which the gear control data will be communicated to the gear control system of the HV via the interface board 420. In an embodiment, the interface board 420 passes testing if the ratio of the gear control data sent from the AV controller 402 to the gear control data received by the interface board 420 is within a predetermined threshold. In an embodiment, the predetermined threshold is determined by the user. In another embodiment, the predetermined threshold is determined based on performance data of the HV. The GUI 600 generates alerts or messages if the interface board 420 passes or fails the test. In an embodiment, the interface board 420 is tested using simulated gear control data generated by the testing environment.

The display module 605 allows the user to test the whether the interface board 420 is successfully transmitting horn control data from the AV controller 402 to the horn control system of the HV. In an embodiment, the interface board 420 passes testing if the ratio of the horn control data sent from the AV controller 402 and the horn control data received by the interface board 420 is within a predetermined threshold. In an embodiment, the predetermined threshold is determined by the user. In another embodiment, the predetermined threshold is determined based on performance data of the HV. The GUI 600 generates alerts or messages if the interface board 420 passes or fails the test. In an embodiment, the interface board 420 is tested using simulated horn control data generated by the testing environment. In another embodiment, display module 605 is used to test whether the interface board 420 can determine the battery status of the HV based on the ability to activate the HV's horn system. In most modern HVs, the lack of any sound upon activating the horn may indicate a dead, damaged, faulty, or non-functional battery. Based on the above, the interface board 420 can be tested to determine whether the interface board 420 is accurately assessing the status of the HV's battery.

The display module 606 shows the connection status between the computer system 300 and the interface controller 422 via the interface board 420, with the current connection status "connected" shown.

The display module 607 shows the current operating status of the interface controller 422, which is manual mode. The display module 607 indicates that the interface controller 422 is ready to receive data from the computer system 300.

The display module 608 shows the different retrofitted HVs that can be selected for testing the interface board 420 as previously described above. Each HV or HV model has unique data transmission parameters to transmit data from AV controller 402 to the various components of the HV via the interface board 420. Therefore, each HV or HV model may require different testing environments that can be represented by difference in GUI 600.

The display module 609 allows the user to test whether the interface board 420 is successfully transmitting brake control data from the AV controller 402 to the brake control system of the HV at a frequency determined by the user. In an embodiment, the interface board 420 passes testing if the ratio of the brake control data sent from the AV controller 402 and the brake control data received by the interface board 420 is within a predetermined threshold. In an embodiment, the interface board 420 passes testing if the ratio of the frequency of the brake control data transmitted by the interface board to the brake control system of the HV via the interface board 420 and the frequency of the brake control data received by the brake control system of the HV is above a pre-determined threshold. In an embodiment, the predetermined threshold is determined by the user. In another embodiment, the predetermined threshold is determined based on performance data of the HV. The GUI 600 generates alerts or messages if the interface board 420 passes or fails the test for transmitting the brake control data. In an embodiment, the interface board 420 is tested using simulated brake control data generated by the testing environment. In an embodiment, the brake control data can be varied in intensity, for example by using a slider as depicted in display module 609. In an embodiment, the interface board 420 passes testing if the ratio of the intensity of the brake control data sent by the AV controller 402 and the intensity of the brake control data received by the interface board 420 is above a predetermined threshold. In an embodiment, the interface board 420 passes testing if the ratio of the intensity of the brake control data transmitted by the interface board to the brake control system of the HV via the interface board 420 and the intensity of the brake control data received by the brake control system of the HV is above a pre-determined threshold. In an embodiment, the frequency of transmitting the brake control data can be modified by the user.

The display module 610 allows the user to whether the interface board 420 is successfully transmitting steering control data from the AV controller 402 to the steering control system of the HV at a frequency determined by the user. In an embodiment, the interface board 420 passes testing if the ratio of the steering control data sent from the AV controller 402 and the steering control data received by the interface board 420 is within a predetermined threshold. In an embodiment, the interface board 420 passes testing if the ratio of the frequency of the steering control data transmitted by the interface board to the steering control system of the HV via the interface board 420 and the frequency of the steering control data received by the steering control system of the HV is above a pre-determined threshold. In an embodiment, the predetermined threshold is determined by the user. In another embodiment, the predetermined threshold is determined based on performance data of the HV. The GUI 600 generates alerts or messages if the interface board 420 passes or fails the test for transmitting the steering control data. In an embodiment, the interface board 420 is tested using simulated steering control data generated by the testing environment. In an embodiment, the steering control data can be varied in intensity, for example by using a slider as depicted in display module 610. In an embodiment, the interface board 420 passes testing if the ratio of the intensity of the steering control data sent by the AV controller 402 and the intensity of the steering control data received by the interface board 420 is above a predetermined threshold. In an embodiment, the interface board 420 passes testing if the ratio of the intensity of the steering control data transmitted by the interface board to the steering control system of the HV via the interface board 420 and the intensity of the steering control data received by the steering control system of the HV is above a pre-determined threshold. In an embodiment, the frequency of transmitting the steering control data can be modified by the user.

The display module 611 allows the user to test the interface board 420 by simulating control signals for manual driving, parked, autonomous driving and emergency modes of operation, where an emergency mode simulation 611*a* is currently selected. The display module 611 can be used in an auto repair shop where the HV is retrofitted to ensure that the interface board 422 is interoperating correctly with the native HV actuators and their corresponding actuator controllers under different modes.

The display module 612 allows the user to test whether the interface board 420 is successfully transmitting throttle control data from the AV controller 402 to the throttle control system of the HV at a frequency determined by the user. In an embodiment, the interface board 420 passes testing if the ratio of the throttle control data sent from the AV controller 402 and the throttle control data received by the interface board 420 is within a predetermined threshold. In an embodiment, the interface board 420 passes testing if the ratio of the frequency of the throttle control data transmitted by the interface board to the throttle control system of the HV via the interface board 420 and the frequency of the throttle control data received by the throttle control system of the HV is above a pre-determined threshold. In an embodiment, the predetermined threshold is determined by the user. In another embodiment, the predetermined threshold is determined based on performance data of the HV. The GUI 600 generates alerts or messages if the interface board 420 passes or fails the test for transmitting the throttle control data. In an embodiment, the interface board 420 is tested using simulated throttle control data generated by the testing environment. In an embodiment, the throttle control data can be varied in intensity, for example by using a slider as depicted in display module 612. In an embodiment, the interface board 420 passes testing if the ratio of the intensity of the throttle control data sent by the AV controller 402 and the intensity of the throttle control data received by the interface board 420 is above a predetermined threshold. In an embodiment, the interface board 420 passes testing if the ratio of the intensity of the throttle control data transmitted by the interface board to the throttle control system of the HV via the interface board 420 and the intensity of the throttle control data received by the throttle control system of the HV is above a pre-determined threshold. In an embodiment, the frequency of transmitting the throttle control data can be modified by the user.

The display module 613 allows the user to test whether the interface board 420 is successfully transmitting blinker control data from the AV controller 402 to the blinker control system of the HV at a frequency determined by the user. In an embodiment, the blinker control data may include data from the left front blinker (or turn-signal indicator), the left back blinker, the right front blinker, the right back blinker, brake lights, all blinkers operating together as hazard lights, head lights (dim and high) among others. In an embodiment, the interface board 420 passes testing if the ratio of the blinker control data sent from the AV controller 402 and the blinker control data received by the interface board 420 is within a predetermined threshold. In an embodiment, the interface board 420 passes testing if the ratio of the frequency of the blinker control data transmitted by the interface board to the blinker control system of the HV via the interface board 420 and the frequency of the blinker control data received by the blinker control system of the HV is above a pre-determined threshold. In an embodiment, the predetermined threshold is determined by the user. In another embodiment, the predetermined threshold is determined based on performance data of the HV. The GUI 600 generates alerts or messages if the interface board 420 passes or fails the test for transmitting the blinker control data. In an embodiment, the interface board 420 is tested using simulated blinker control data generated by the testing environment. In an embodiment, the frequency of transmitting the blinker control data can be modified by the user.

Referring to FIG. 6B, the layout of the status tab 601b includes display modules 614-618 that providing status of the interface board 420. In an embodiment, the status tab is used to introduce errors or faults to conduct fault-based testing of the interface board 420. Such testing is crucial to determine the behavior of interface board 420 under fringe conditions and to ensure the safety and reliability of AV system 100 and interactions of the AV system 100 with the HV. In an embodiment, display module 614 shows various interface controller (microcontroller) status fields including:

Mc Status—microcontroller status
uTime—UTC time code
counter—error counter
current mode—manual, autonomous, parked, etc.
pc_ready—messages received from onboard computer of host computer according to frequency set on control screen In an embodiment, the display module 615 shows an "out of tasks" checkbox that when checked introduces an "out of memory" fault into the interface board 420; i.e., the interface board 420 is out of memory to process tasks such as receiving messages from the AV system 300, detecting state of various ports, checking interface controller status, etc. In an embodiment, the memory or memory storage device associated with the interface board 420 is similar to memory or memory storage devices described elsewhere in this application. In response to the out of memory fault, the interface board 420 stops accepting new tasks until more memory becomes available.

Display module 616 shows universal asynchronous receiver/transmitter (UART) errors, where the various checkboxes can be used to introduce various types of errors and the behavior of the interface board 420 can be verified. The UART is used for serial communication between the interface board 420 and the AV computer system 300.

Display module 617 shows frame errors, where the interface board 402 uses a protocol buffer protocol to communicate with the AV computer system 300. The protocol buffer protocol sends messages as frames. The errors listed are errors associated with the protocol buffer frames. The various checkboxes can be used to introduce various types of errors and the behavior of the interface board 420 can be verified.

Display module 618 shows controller area network (CAN) bus errors from the CAN bus of the AV 100. The various checkboxes can be used to introduce various types of errors and the behavior of the interface board 420 can be verified.

Referring to FIG. 6C, the layout of the debug tab 601c includes display module 619 showing various parameters of an external DAC. The interface board 402 is connected to an external DAC to test the fidelity of the steering or throttle control signals sent by the interface board 402 to the steering and throttle actuators of the host vehicle. Values are input in the right hand fields and output is displayed in the left hand field. Both values should match (or be within some margin of error).

Automatic Configuration and Testing of Interface Board

In an embodiment, the interface controller 422 or the computer system 300/controller 402 automatically detects the make, model and build of the HV when the interface board 420 is installed and/or powered up and initialized. For example, the interface controller 422 can retrieve HV identifying information (e.g., a vehicle identification number) from a storage device in the HV, and then use that identifying information to retrieve configuration data tailored for the HV. In embodiment, the interface controller 422 can pass the identifying information to the computer system 300/controller 402 which then retrieves the configuration data for the HV from a storage device, such as storage device 310 in computer system 300. In an embodiment, the computer system 300 can query a network database server (e.g., cloud data center 204a) for the HV configuration data using the HV identifying information in the query. The configuration data can include calibration data and other signal conditioning data that can be used to ensure compatibility of sensor signals from actuator sensors of the HV with the interface controller 422, and compatibility of control signals from the interface controller 422 with the native actuator controllers of the HV, as described in reference to FIG. 5.

After the configuration data is used to configure the board, the interface controller 422 can initiate a self-diagnostic test to ensure that the installation in the HV was performed successfully and that all functions of the interface board are working as expected. Only after successful diagnostic testing, is the AV 100 is enabled for operation.

In an embodiment, the configuration data is based on weather and/or road surface conditions. For example, the configuration data can be used to configure a driving mode of the AV 100 for a particular weather or road surface condition. For example, the configuration data can be used to provide quicker torque application and more sensitive feedback by adjusting the suspension and steering settings of the AV 100, respectively. In an embodiment, configuration data can be used to adjust steering gears to provide increased on-center sharpness and steering sensitivity for more precise control of the AV 100. In an embodiment, configuration data is used to adjust damping for each wheel of the AV 100 to maintain an optimal vehicle ride control over a particular road surface condition to reduce and control vehicle roll, pitch and vertical motions for a flat ride performance. In an embodiment, the configuration data is used to adjust damping to a firm level for improved handling and stability of the AV 100, and to a soft level to provide increased isolation from the road surface and thus improved ride comfort for the passengers of the AV 100.

In some cases, it may be unsafe to operate the AV 100 at speeds that exceed a maximum speed due to weather or road surface conditions. In such a scenario, the configuration data can include a maximum throttle position that the throttle cannot exceed to ensure the AV 100 is operated within a maximum safe and/or legal speed limit due to weather and/or road surface conditions. In another example, the brake sensitivity, anti-lock braking system (ABS) or suspension system of the AV 100 is adjusted using configuration data based on road surface conditions (e.g., wet/icy surface, off-road conditions). In another example, 4-wheel or all-wheel drive is automatically engaged using the configuration data (e.g., engaged in wet, icy or snowy conditions).

Figure 7:
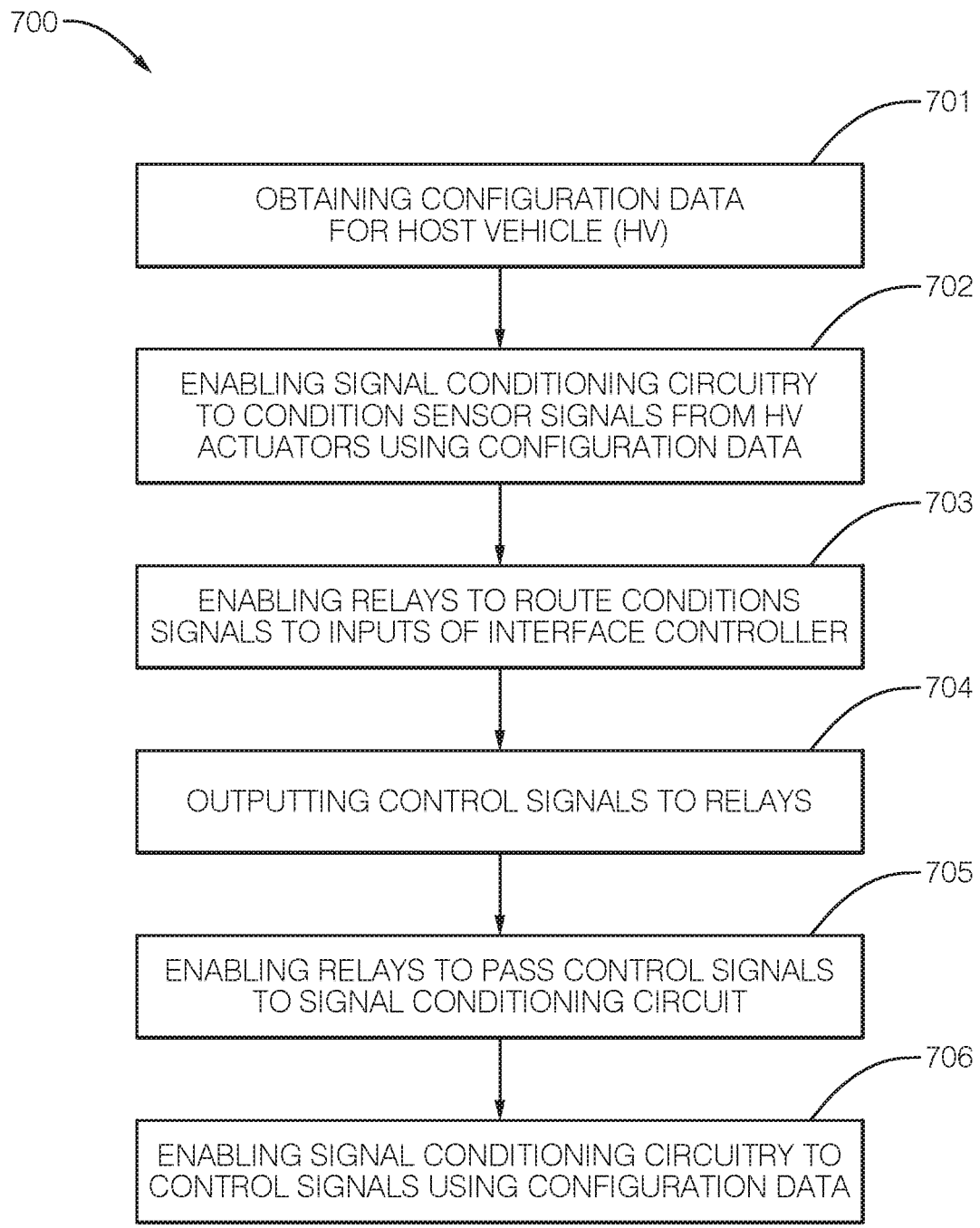
FIG. 7 is a flow diagram of a process for automatically configuring the electronic interface board of FIG. 5 with configuration data.

FIG. 7 is a flow diagram of a process 700 for automatically configuring the electronic interface board 420 of FIG. 5 with configuration data. Process 700 can be implemented using the interface system 500 as described in reference to FIG. 5.

Process 700 begins by obtaining, using an interface controller, configuration data for a host vehicle from a plurality of configuration data for different host vehicles (701). For example, configuration data can be retrieved from a storage device on the interface board (e.g., flash memory), from cache memory in the interface controller 422 or from computer system 300. For example, in an embodiment computer system 300 queries cloud data center 204a for configuration data by sending a query to the cloud data center 204a that includes HV identifying information.

Process 700 continues by enabling, using the interface controller, signal conditioning circuitry to condition sensor signals received from actuator sensors of a host vehicle using the configuration data (702). For example, signal processing circuitry can receive configuration data from the interface controller 422 that can be used to initialize and/or set registers, filters, latches, power supplies and any other circuits in the signal processing circuitry to adjust one or more electrical or data characteristics of sensor and/or control signals including but not limited to: adjusting voltage or current levels, adjusting a frequency spectrum or bandwidth, adjusting the data rate/frequency, etc.

Process 700 continues by enabling, using the interface controller, relays to route the conditioned sensor signals to inputs of the interface controller (703). For example, relays are coupled or otherwise disposed between the interface controller input/output ports and actuator sensors and their respective actuator controllers (e.g., ECUs). The interface controller can enable/disable the relays based on the operating mode of the AV 100 (e.g., manual or autonomous). Any type of relay can be used including but not limited to: electromechanical relays, reed relays, latching and non-latching relays and solid-state relays. In an embodiment, relays can be replaced with any other type of switching mechanism (e.g., FET switches, multiplexers, thyristors).

Process 700 continues by outputting, using the interface controller, control signals to the relays (704). For example, control signals can be generated by AV controller 402 and sent to interface controller 422 over communication interface 421.

Process 700 continues by enabling, using the interface controller, the relays to pass the control signals to the signal conditioning circuitry (705). For example, the interface controller 422 can send enable/disable signals to the relays based on the operating mode of the AV 100.

Process 700 continues by enabling, using the interface controller, the signal conditioning circuitry to condition the control signals using the configuration data (706). For example, the interface controller 422 can provide the signal conditioning circuitry 503 with configuration data for adjusting the electrical characteristics of sensor and control signals, as described in reference to FIG. 5.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. An interface system, comprising:
a host vehicle including actuator sensors, actuator controllers and an autonomous driving computer system; and
an interface board coupled to the autonomous driving computer system and to the actuator sensors and actuator controllers, the interface board including:
relays operable to route actuator sensor signals and control signals to and from the interface board, wherein the relays are configured to route actuator sensor signals output by the actuator sensors to the actuator controllers in response to a first signal, and route the actuator sensor signals to the autonomous driving computer system and control signals from the autonomous driving computer system to the actuator controllers in response to a second signal;
signal conditioning circuitry operable to adjust electrical characteristics of the sensor and control signals;
an interface controller coupled to the relays and the signal conditioning circuitry, the interface controller operable to:
obtain configuration data for the host vehicle from a plurality of configuration data for different host vehicles;
enable the signal conditioning circuitry to condition the sensor signals received from the actuator sensors using the configuration data;
enable the relays to route conditioned sensor signals to inputs of the interface controller;
output the control signals to the relays;
enable the relays to pass the control signals to the signal conditioning circuitry; and
enable the signal conditioning circuitry to condition the control signals using the configuration data.

2. The interface system of claim 1, wherein the interface controller is operable to:
cause a graphical user interface to be presented on a display, the graphical user interface allowing a user to select the host vehicle from a plurality of different host vehicles;
receive a user selection of the host vehicle; and
obtain the configuration data for the host vehicle in accordance with the user selection.

3. The interface system of claim 2, wherein the graphical user interface includes controls that allow the user to test various functions of the interface board.

4. The interface system of claim 2, wherein the configuration data includes data rates and the graphical user interface includes controls that allow the user to manually select data rates for the interface board.

5. The interface system of claim 1, wherein the configuration data is obtained from memory on the interface board.

6. The interface system of claim 1, wherein the interface board is operable to:
automatically detect that the interface board is coupled to the host vehicle;
receive data from the host vehicle that identifies a make, model or build of the host vehicle; and
obtain the configuration data for the identified make, model or build of the host vehicle.

7. The interface system of claim 1, wherein the interface board obtains the configuration data from the autonomous driving computer system.

8. The interface system of claim 1, wherein one of the actuator sensors is a steering torque sensor and one of the actuator controllers is a steering electronic control unit (ECU) that controls steering torque of the host vehicle.

9. The interface system of claim 1, wherein one of the actuator sensors is a throttle pedal sensor and one of the actuator controllers is a throttle electronic control unit (ECU) that controls the throttle of the host vehicle.

10. The interface system of claim 1, wherein one of the actuator sensors is a brake pedal displacement sensor and one of the actuator controllers is brake electronic control unit (ECU) that controls the brakes of the host vehicle.

11. The interface system of claim 1, wherein the signal conditioning circuitry is operable to adjust at least one of voltage, current or data rate of the sensor signals or control signals.

12. The interface system of claim 1, wherein the interface controller is further operable to:
monitor one or more of the sensor signals or control signals for offset errors; and
automatically compensate the sensor signals or control signals using the configuration data.

13. The interface system of claim 1, further comprising:
a wireless transceiver that allows wireless communication with a network-based computing platform through a wireless access point, and to obtain the configuration data from the network-based computing platform through the wireless access point.

14. The interface system of claim 1, wherein the configuration data is used to configure a driving mode of the host vehicle for a particular weather or road condition.

15. The interface system of claim 14, wherein the configuration data is applied to a throttle to ensure a maximum or minimum speed is not exceeded.

16. An interface board, comprising:
a printed circuit board;
relays disposed on the printed circuit board and operable to route sensor signals and control signals to and from the interface board, wherein the relays are configured to route actuator sensor signals output by the actuator sensors to the actuator controllers in response to a first signal, and route the actuator sensor signals to an autonomous driving computer system and control signals from the autonomous driving computer system to the actuator controllers in response to a second signal;
signal conditioning circuitry disposed on the printed circuit board and operable to adjust electrical characteristics of the sensor and control signals;
an interface controller disposed on the printed circuit board and coupled to the relays and the signal conditioning circuitry, the interface controller operable to:
obtain configuration data for a host vehicle from a plurality of configuration data for different host vehicles;
enable the signal conditioning circuitry to condition sensor signals received from actuator sensors of the host vehicle using the configuration data so that the sensor signals are compatible with the interface controller;
enable the relays to route the conditioned sensor signals to inputs of the interface controller;
output control signals to the relays;
enable the relays to pass the control signals to the signal conditioning circuitry; and
enable the signal conditioning circuitry to condition the control signals using the configuration data so that the control signals are compatible with actuator controllers of the host vehicle.

17. The interface board of claim 16, further comprising:
a storage device operable to store the configuration data.

18. The interface board of claim 16, wherein the interface board further comprises:
analog-to-digital converters operable to convert analog sensor signals into digital sensor signals; and
digital-to-analog converters operable to convert digital control signals into analog control signals.

19. The interface board of claim 16, wherein the signal conditioning circuitry includes voltage or current level shifting circuitry.

20. The interface board of claim 16, wherein the interface controller or signal conditioning circuitry is operable to adjust at least one of a data rate of the sensor signals or the data rate of the control signals.

21. A method comprising:
obtaining, using an interface controller, configuration data for a host vehicle from a plurality of configuration data for different host vehicles;
enabling, using the interface controller, signal conditioning circuitry to condition sensor signals received from actuator sensors of a host vehicle using the configuration data; and
enabling, using the interface controller, relays to route sensor signals output by the actuator sensors to actuator controllers of the host vehicle in response to a first signal, and route the actuator sensor signals to an autonomous driving computer system and control signals from the autonomous driving computer system to the actuator controllers in response to a second signal.

* * * * *